United States Patent [19]
Weinberger

[11] Patent Number: 5,357,813
[45] Date of Patent: Oct. 25, 1994

[54] PRESSURE SENSOR

[75] Inventor: Imanuel Weinberger, Haifa, Israel

[73] Assignee: The State of Israel, Ministry of Defence, Tel-Aviv, Israel

[21] Appl. No.: 958,078

[22] Filed: Oct. 7, 1992

[30] Foreign Application Priority Data

Oct. 17, 1991 [IL] Israel ....................... 99773

[51] Int. Cl.$^5$ .................................. G01L 1/24
[52] U.S. Cl. ................................ 73/865.7; 73/800
[58] Field of Search ............... 73/800, 705, 862.624, 73/865.7; 340/555, 815.31; 385/13; 250/227.14, 227.16

[56] References Cited

U.S. PATENT DOCUMENTS

| Re. 33,651 | 7/1990 | Blonder et al. | 361/291 |
|---|---|---|---|
| 4,560,016 | 12/1985 | Ibanez et al. | 73/800 X |
| 4,618,764 | 10/1986 | Harmer | 250/227.14 |
| 4,781,056 | 11/1988 | Noel et al. | 73/1 B |
| 4,812,645 | 3/1989 | Griffiths | 73/800 X |
| 4,937,029 | 6/1990 | Ishiharada et al. | 264/1.4 |
| 5,056,884 | 10/1991 | Quinlan, Jr. | 385/13 |

FOREIGN PATENT DOCUMENTS

| 0049979 | 4/1982 | European Pat. Off. . |
|---|---|---|
| 0246487 | 11/1987 | European Pat. Off. . |
| 0393956 | 10/1990 | European Pat. Off. . |
| 3322046 | 2/1984 | Fed. Rep. of Germany . |
| 2810971 | 2/1985 | Fed. Rep. of Germany . |
| 3628083 | 3/1988 | Fed. Rep. of Germany . |
| 2015844 | 12/1979 | United Kingdom . |

Primary Examiner—Robert Raevis
Assistant Examiner—James M. Olsen
Attorney, Agent, or Firm—Synnestvedt & Lechner

[57] ABSTRACT

A pressure actuated sensor device (20) has an upper plate (21) functionally cooperating with an optical fiber (26) so that when pressure is applied onto the upper plate (21) light transmitted through the optical fiber is attenuated. The optical fiber (26) in the device (20) is sandwiched between one layer (24) made of a flexible material and a second layer (25) of rigid wires.

3 Claims, 2 Drawing Sheets

PRESSURE SENSOR

FIELD OF THE INVENTION

The present invention concerns a pressure actuated sensor device which is essentially planar adapted to be installed in a floor, in the ground and the like. The pressure actuated sensor device of the present invention is suitable for use in alarm systems for detecting people or animals stepping thereon.

The device of the invention comprises an optical fiber and the pressure detection is based on an attenuation of light transmitted through the optical fiber upon application of pressure on the sensor device.

BACKGROUND OF THE INVENTION

Pressure actuated sensors form an integral part of many domestic alarm systems as well as in such used in security installations. Such a sensor is placed on a floor, on the ground or slightly below the ground's surface and when a person steps on that sensor, an alarm is initiated.

Optical fibers-based sensors play an increasingly important role in security and alarm systems owing to their reliability, durability, and the relative simplicity of the associated components. Optical fibers have accordingly found applications also in pressure sensors. In one such optical fiber-based pressure sensor, Hergalite TM (Herga Electric, U.K.) use is made of optical cables attached to an upper surface of a rigid support plate, the cable consisting of an external layer made of a pliable material and an internal core consisting of an optical fiber surrounded by a spiral rigid wire.

In other kinds of optical fibers-based pressure sensors, use is made of special pressure sensitive optical fibers.

In sensors of the above type, the application of pressure on the sensor causes attenuation of the light transmitted through the optical fiber.

All optical fibers-based pressure sensors suitable for use in alarm systems available to date, use very expensive hardware and such sensors are accordingly unsuitable for widespread use and their use has indeed been limited.

It is the object of the present invention to provide a pressure actuated optical fiber-based sensor which is made of very cheap and readily available hardware and is thus suitable for widespread application.

GENERAL DESCRIPTION OF THE INVENTION

The present invention provides an essentially planar, pressure actuated sensor device which comprises an upper plate functionally cooperating with an optical fiber associated with a light emitter means at its one end and with a light detector means at its other end, so that the application of pressure on said upper plate causes an attenuation of the light detected by said detector means; said sensor device being characterized in that:

it comprises a pressure sensing assembly sandwiched between said upper plate which is essentially rigid and a rigid base, said sensing assembly comprising a first layer made of a flexible material, a second layer consisting of rigid wires and between said first and second layers a tortuous optical fiber arranged in a plane between the two layers in an essentially uniform manner throughout the plane.

The rigid wires in said second layer may be suitably arranged in the form of a network of wires although other kinds of arrangements, e.g. a plurality of parallel wires, are possible.

The term "uniform manner" implies that about the same length of fiber passes through equal area portions of the plane, i.e. there will be about the same "fiber density" throughout the plane. It should however be understood that this uniformity is only on a relatively large scale and some small-scale variations in fiber density may occur.

The optical fiber may be almost any type of optical fiber including single-mode and multi-mode optical fibers of the kind conventionally used in communication.

The arrangement of the optical fiber in the plane between said first and second layer may be in a manner in which the form of the path taken by the fiber throughout the plane resembles that of a sinus, e.g. a single sinusoidal-like curve in one direction, two sinusoidal-like curves at right angles to one another and the like. It will no doubt be appreciated by the artisan that these are only examples of an almost infinite manners of arrangement of the fiber.

In the sensing means said first layer may be on top of the tortuous optical fiber and said second layer below or alternatively said first layer may be below the optical fiber and said second layer on top.

The pressure sensing of the device is based on the attenuation of light transmitted through the fiber caused by the slight bends which occur at the contact points between the optical fiber and the wires of the second layer. Increasing the density of the wires (density meaning here the number of wires crossed by a line of a unit length), will increase the number of the contact points but it will be appreciated that there is a certain optimum in the density of the wires above and below of which the pressure induced attenuation in the transmitted light will be lower. The optimal density of the wires depends to a large extent on the physical parameters of the fiber, e.g. its total diameter including the coating and the diameter of its core. The artisan will have no difficulties with a limited amount of experiments to determine a suitable density of the wires in each case. For example, where the external diameter of the fiber (including the coating) is about 250 $\mu$m and that of the cladded core is about 125 $\mu$m, a suitable density of the wires is such that the distance between adjacent wires in the second layer is about 5–10 mm.

Where the sensor device is relatively small, i.e. intended for covering a small area, it may consist of a single upper board. However, where the sensor device is relatively large, i.e. intended for covering a large area, it will suitably comprise a plurality of upper boards each corresponding to a portion of that area.

The sensor device of the present invention may be made to be an integral part of a floor, in which case the upper board thereof may be made to be one of the floor tiles or panels. Furthermore, in such a case the base of the device may, if desired, be the concrete foundation of the floor.

The device of the invention may also be placed in the ground covered by a thin layer of soil or gravel. In such a case, the base of the device will be an integral part thereof and may suitably be a rigid plate made of metal, wood, plastic and the like.

DESCRIPTION OF SPECIFIC EMBODIMENTS

In the following, the invention will at times be illustrated with reference to some non-limiting specific embodiments depicted in the annexed drawings. It will be appreciated by the artisan that this illustration is by way of example only and the invention may be practiced by various other embodiments within the scope of the invention as defined herein.

Figure 2:
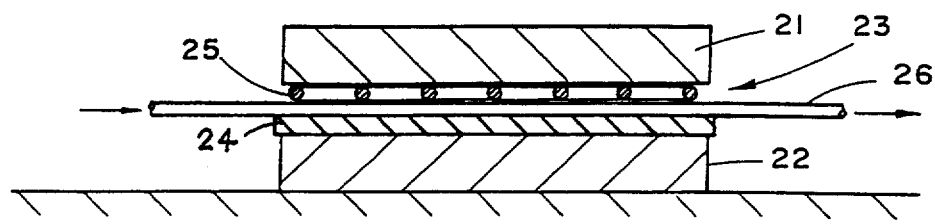
FIG. 2 shows a schematic side view of a device in accordance with the invention.
Figure 1:
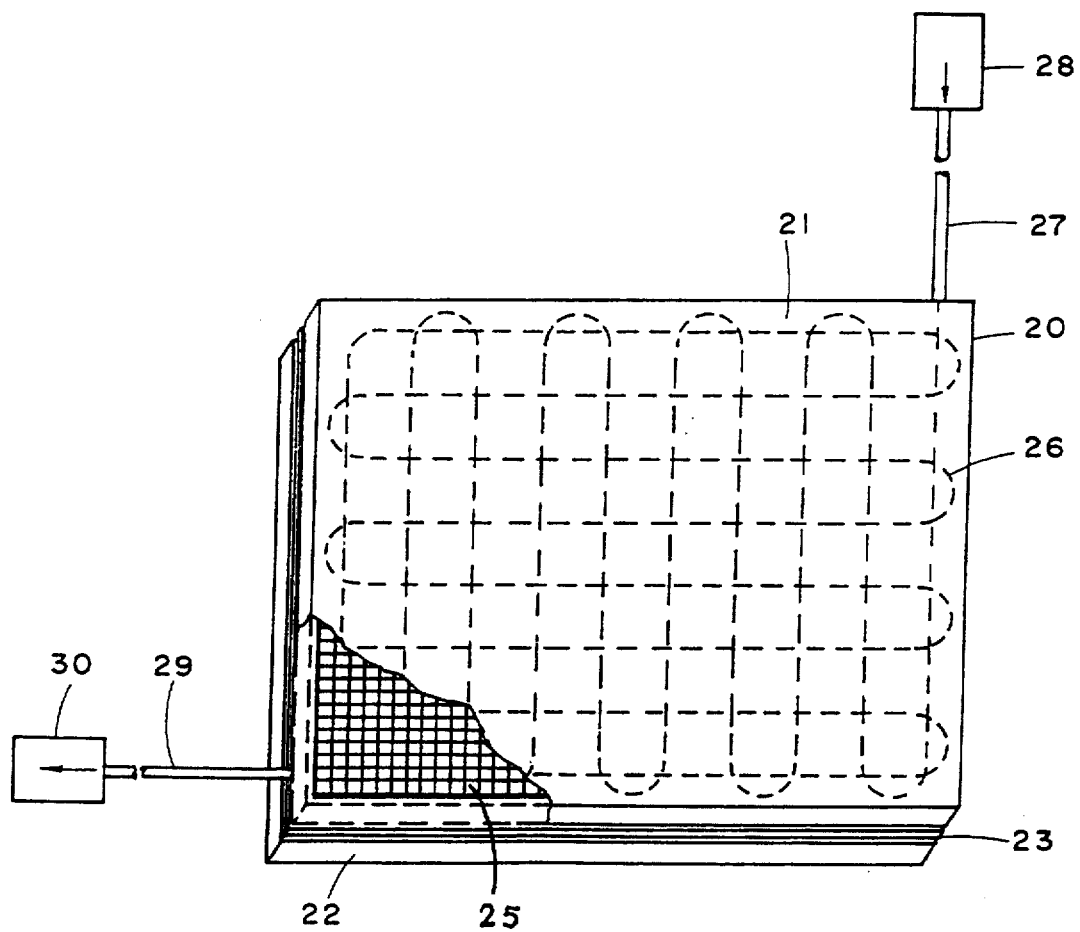
FIG. 1 shows a perspective view from above of a sensor device in accordance with the present invention in which a portion of the upper panel has been removed to show the components below.

Reference is made to FIGS. 1 and 2 which show a sensor device in accordance with the invention. Device 20 comprises an upper panel 21 and a base panel 22 both made of an essentially rigid material such as wood, plastic, metal and the like, and comprises a sensing assembly 23 sandwiched between the two boards.

Sensing assembly 23 comprises a sheet 24 made of a flexible material such as rubber and a rigid wire network 25 and further comprises a tortuous optical fiber 26 arranged in a manner resembling two sinusoidal curves in right angle to one another. The optical fiber thus has an essentially uniform arrangement throughout the plane.

One end 27 of the optical fiber is associated with a light emitting means 28 which may be a light emitting diode, a laser and the like. The other end 29 of the optical fiber is associated with a light detecting means 30. Application of pressure on upper panel 21 slightly deforms the optical fiber, which deformation results in attenuation of the light transmitted through the optical fiber and hence that which is detected by detecting means 30.

As may readily be appreciated by the artisan, in order to increase sensitivity, namely in order to increase the degree of attenuation as a result of pressure application, the density of the optical fiber may be increased.

In the following, tests conducted with a sensor device in accordance with the invention are described.

TEST NO. 1

The sensor device which was used in this test was 100 cm long and 60 cm wide. For the preparation of the device a 2 mm thick rubber sheet was placed on top of a 9 mm thick wood panel, then a tortuous optical fiber was attached to the rubber sheet which was then covered by a network consisting of plastic wires in right angle orientation to one another, the distance between two adjacent wires being 7 mm. The optical fiber was a single-mode fiber (Corguide TM SMF-21 TM, Corning) having a nominal mode-field diameter of 10 μm, a total core diameter of 125 μm coated by a UV-cured acrylate coating having an external diameter of 250 μm. The total length of the optical fiber within the device was about 15 meters and the optical fiber was arranged in a manner resembling two right-angled sinuses as shown in FIG. 3.

One end of the optical fiber received light input from a light emitting diode (Ando AQ-4140 (130), Ando Ltd.) and the other end of the optical fiber was connected to an ANDO AQ-2105 TM detector (Ando Ltd).

Figure 3:
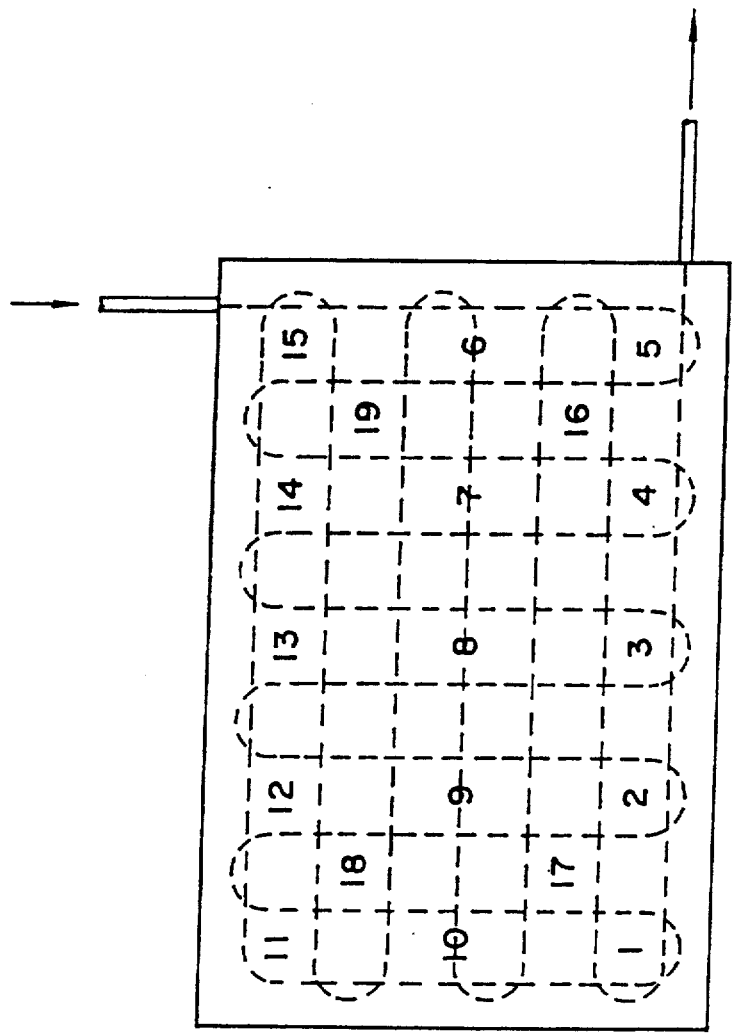
FIG. 3 shows a view from above of a sensor device in accordance with the present invention of the kind used in the tests reported hereinbelow, showing the various points, numbered from 1 to 19, on which loads were placed during the tests.

Various loads were put on the various points on the upper panel identified by the numerals 1 to 15 in FIG. 3 and a light sealing was made. It should be noted that these points were originally chosen arbitrarily. Before each reading with a different weight, a control reading was made.

The results obtained with the different loads are shown in the following Table I:

TABLE I

| Point | 9.6 Kg | 19.2 Kg | 27.4 Kg | 75.0 Kg |
|---|---|---|---|---|
| Control* | 7.75 nw | 8.12 nw | 8.48 nw | 8.35 nw |
| 1 | 6.22 nw | 3.9 nw | 1.3 nw | 30–50 pw |
| 2 | 4.13 nw | 1.72 nw | 0.85 nw | 8.5 pw |
| 3 | 3.53 nw | 0.95 nw | 0.33 nw | 8.0 pw |
| 4 | 3.64 nw | 0.48 nw | 0.24 nw | 8.2 pw |
| 5 | 4.34 nw | 1.10 nw | 0.44 nw | 7.8 pw |
| 6 | 5.09 nw | 2.48 nw | 0.73 nw | 2.6 pw |
| 7 | 4.4 nw | 1.2 nw | 0.27 nw | 9.3 pw |
| 8 | 5.56 nw | 3.95 nw | 2.26 nw | 19.2 pw |
| 9 | 5.45 nw | 2.67 nw | 1.4 nw | 16.0 pw |
| 10 | 5.77 nw | 2.77 nw | 0.85 nw | 10.0 pw |
| 11 | 4.6 nw | 2.11 nw | 1.3 nw | 27.0 pw |
| 12 | 2.38 nw | 0.93 nw | 0.32 nw | 10.5 pw |
| 13 | 3.6 nw | 3.05 nw | 1.50 nw | 10.8 pw |
| 14 | 3.79 nw | 1.25 nw | 0.35 nw | 8.5 pw |
| 15 | 4.9 nw | 3.15 nw | 1.32 nw | 8.2 pw |

*Control = zero weight
nw = nano watt
pw = pico watt

As the above results show, already with a load of 19.2 Kg a significant attenuation of the signal detected by the detector occurred, while with a load of 75 Kg which is about the weight of an average adult male, the light was attenuated up to about 1000 folds.

TEST NO. 2

In order to test the reliability of the device, a reading was made with no load and then a 125 kg load was placed on various points on the surface of the upper panel. Following 15 readings (the load placed consecutively on points 1-15) a control reading was taken again.

The control reading in this experiment was 8.5 nw and that obtained with the application of a load at various points was between 5–10 pw in all cases. Upon removal of the loads the reading returned exactly to the control value.

TEST NO. 3

A similar device to that of Test No. 1 has been prepared which differed however from the latter in that rather than a 2 mm thick rubber layer, a 1 mm thick rubber layer was used and in that the light source was a SM501 TM laser (Lasertron Inc.) which emits light at a wavelength of 1550 nm operated in accordance with manufacturer's specification, with a 5 volt DC current of 30 milliamperes.

Similarly as in Test No. 1, different loads were placed in different points and the results are shown in the following Table II:

TABLE II

| Point | 27.4 Kg | 125.0 Kg |
|---|---|---|
| Control | 5.04 μw | 5.04 μw |
| 1 | 3.0 nw | 6.5 pw |
| 3 | 42.5 nw | 7.0 pw |
| 5 | 28.0 nw | 8.0 pw |
| 6 | 1.7 nw | 3.5 pw |
| 8 | 9.0 nw | 13.0 pw |
| 10 | 0.15 nw | 5.0 pw |
| 11 | 1.8 nw | 6.5 pw |
| 13 | 0.9 nw | 8.5 pw |

TABLE II-continued

| Point | 27.4 Kg | 125.0 Kg |
|---|---|---|
| 15 | 5.0 nw | 3.6 pw |

μw = micro watt
nw = nano watt
pw = pico watt

As can be seen, in this case the light was attenuated about 100–1000 folds with a load of 27.4 Kg and up to $10^6$ fold with a load of 126 Kg.

TEST NO. 4

The device of Test No. 3 was buried under 4 cm of sand mixed with gravel. A similar experiment was repeated and the results are shown in the following Table III:

TABLE III

| Point | 27.4 Kg | 125.0 Kg |
|---|---|---|
| Control | 28.0 nw | 26.0 nw |
| 8 | 0.82 nw | 6.0 pw |
| 16 | 0.35 nw | 3.0 pw |
| 17 | 0.36 nw | 5.0 pw |
| 18 | 0.35 nw | 7.0 pw |
| 19 | 64.0 pw | 3.0 pw | nw = nano watt
pw = pico watt

The above results show that even when buried under gravel a significant attenuation of about 30–100 fold occurred even with a 27.4 Kg while with a 125 Kg load the attenuation of the transmitted light was about 4000–8000 folds.

I claim:

1. An essentially planar, pressure actuated sensor device which comprises an upper plate functionally cooperating with a tortuous optical fiber associated with a light emitter means at its one end and with a light detector means at its other end, the application of pressure on said upper plate causing an attenuation of the light detected by said detector means; said sensor characterized in that it comprises a pressure sensing assembly sandwiched between said upper plate, which is essentially rigid, and a rigid base, said sensing assembly comprising a first layer made of a flexible material, a second planar layer of a network of rigid wires, and between said first and second layers a said tortuous optical fiber arranged in a plane said wires arranged only on one side of said fiber between the two layers in an essentially uniform manner throughout the plane, whereby upon application of pressure on said upper plate, said wires press the optical fiber against the layer of flexible material to produce local bendings of said fibers and said attenuation.

2. A device according to claim 1, wherein the tortuous optical fiber is arranged in sinus-like manner.

3. A device according to claim 1, wherein the optical fiber has an external diameter of about 250 μm and the distance between adjacent wires in the network is about 5–10 mm.

* * * * *

UNITED STATES PATENT AND TRADEMARK OFFICE
CERTIFICATE OF CORRECTION

PATENT NO. : 5,357,813
DATED : October 25, 1994
INVENTOR(S) : Imanuel Weinberger It is certified that error appears in the above-indentified patent and that said Letters Patent is hereby corrected as shown below:

On the title page, item [73], Assignee: should read
"The State of Israel, Ministry of Defence,
Rafael Armament Development Authority"

Signed and Sealed this

Sixteenth Day of May, 1995

Attest:

BRUCE LEHMAN

Attesting Officer

Commissioner of Patents and Trademarks